Patented Aug. 6, 1940

2,210,072

UNITED STATES PATENT OFFICE 2,210,072

MONOAZO DYESTUFFS INSOLUBLE IN WATER

Ernst Fischer, Offenbach-on-the-Main, Germany, assignor to General Aniline & Film Corporation, a corporation of Delaware No Drawing. Application February 21, 1939, Serial No. 257,763. In Germany February 23, 1938

5 Claims. (Cl. 260—203)

The present invention relates to monoazo dyestuffs insoluble in water; more particularly it relates to dyestuffs of the following general formula:

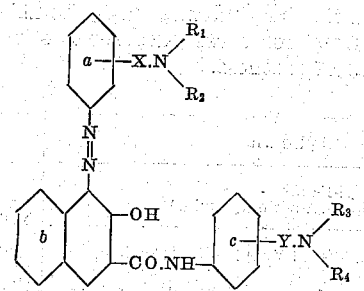

wherein X and Y stand for one of the groups —CO— and —SO$_2$—, $R_1$, $R_2$, $R_3$ and $R_4$ stand for alkyl, aralkyl, aryl or hydroaromatic radicals which may be connected in a heterocyclic ring system, wherein the benzene radicals $a$ and $c$ may contain further alkyl-, alkoxy-, aralkoxy-, aryloxy-groups or halogen atoms and wherein the naphthalene radical may contain as substituent in the nucleus $b$ an alkoxy-group or halogen.

I have found that valuable pigment dyestuffs are obtainable by coupling a diazo-compound from an amine of the general formula:

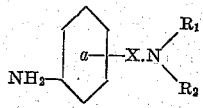

wherein X stands for the group —CO— or —SO$_2$—, $R_1$ and $R_2$ stand for alkyl-, aralkyl-, aryl- or hydroaromatic radicals which may be connected in a heterocyclic ring system, and wherein the benzene radical $a$ may contain further alkyl-, alkoxy-, aralkoxy- or aryloxy-groups or halogen atoms, with an arylide of 2-hydroxynaphthalene-3-carboxylic acid of the following general formula:

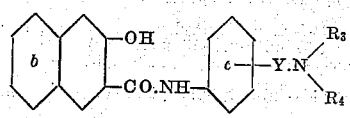

wherein Y means the group —CO— or —SO$_2$—, $R_3$ and $R_4$ stand for alkyl-, aralkyl-, aryl- or hydroaromatic radicals which may be connected in a heterocyclic ring system, and wherein the naphthalene radical may contain as substituent in the nucleus $b$ an alkoxy-group or halogen and the benzene radical $c$ may contain alkyl, alkoxy, aralkoxy-, aryloxy-groups or halogen atoms, only such dyestuff components being used as do not contain any group lending solubility in water, such as a sulfonic or carboxylic acid group.

The new dyestuffs yield orange to violet shades of good properties of fastness. They are insoluble in water, but very easily soluble in many organic solvents, such as hydrocarbons, alcohols, esters, ketones, and can, therefore, be used for coloring these solvents as well as the lacquers prepared by means of these solvents, such as nitro- or acetyl-cellulose lacquers, films or plastic masses. They are also very suitable for coloring varnishes, candles and fats. Owing to the different substituents present in the dyestuffs, the suitability of the organic solvents named varies; the most suitable solvents may, however, easily be ascertained by experiment.

In comparison with the dyestuffs described in French Patent No. 749,926, the dyestuffs obtainable by this invention are distinguished by their considerably better solubility in organic solvents so that they are especially suitable for coloring substances of the above kind, whereas the dyestuffs of the said patent have a solubility too small for these purposes.

The following examples serve to illustrate the invention, but they are not intended to limit it thereto; the parts are by weight:

1. 15.7 parts of 1-amino-2-methoxybenzene-5-(sulfonyl-n-dibutylamine) are diazotized in the usual manner. In order to bind the excess of mineral acid, sodium acetate is added to the diazo-solution and the whole is then introduced, while stirring, into a solution of 24.2 parts of 2.3-hydroxynaphthoyl-1'-amino-2'-methoxybenzene-5'-(sulfonyl-n-dibutylamine) in diulte caustic soda solution. When the coupling is complete, the dyestuff formed is filtered with suction, washed well and dried. It is a red powder which easily dissolves in acetone, ethyl alcohol and other organic solvents and colors cellulose ester lacquers vivid bluish-red tints of good properties of fastness. The dyestuff corresponds with the following formula:

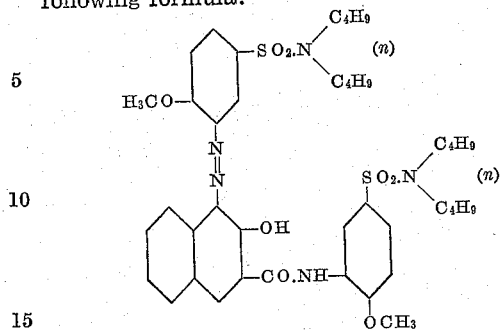

2. 14.9 parts of 1-amino-2-methylbenzene-5-(sulfonyl-n-dibutylamine) are diazotized as usual. The diazo-solution is rendered neutral to Congo paper by means of sodium acetate and stirred into a solution of 23.4 parts of 2.3-hydroxynaphthoyl-1'-amino-2'-methylbenzene-5'-(sulfonyl-n-dibutylamine) in dilute caustic soda solution. The dyestuff formed is filtered with suction, washed well and dried. It easily dissolves in butyl acetate, ethyl acetate, butyl alcohol and other organic solvents and colors nitro- and acetyl-cellulose lacquers as well as varnishes vivid red tints which are much more yellowish than those obtainable with the product of Example 1.

3. If there are used in Example 1 instead of 15.7 parts of 1-amino-2-methoxybenzene-5-(sulfonyl-n-dibutylamine), 9.6 parts of 1-aminobenzene-4-(carbonyl-diethylamine), a dyestuff having similarly good properties of fastness is obtained; it colors the various organic solvents and the lacquers prepared therewith as well as candles and fats yellowish-red tints.

4. A pigment dyestuff is prepared in the manner described in Examples 1 and 2 from 17.3 parts of 1-amino-2-methoxybenzene-5-(carbonyl-dibenzylamine) and 22.7 parts of 2.3-hydroxynaphthoyl-1'-aminobenzene-4'-(sulfonyl-n-dibutylamine). It dissolves easily in butyl acetate and xylene and colors varnishes and nitro- or acetyl-cellulose lacquers red tints of good fastness to light.

5. From the diazo-compound of 11.7 parts of 1-amino-2-methoxybenzene-5-(carbonyl-N-piperidine) and 23.4 parts of 2-hydroxynaphthoyl-1'-amino-2'-methoxybenzene-5'-(carbonyl-N-(n)-butyl-phenylamine) there is obtained, in the manner described in Examples 1 and 2, a red dyestuff which dissolves easily in organic solvents and colors plastic masses and lacquers prepared therewith as well as candles and fats bluish-red tints of good fastness to light.

The following table comprises a number of other monoazo dyestuffs obtainable by this invention which are likewise easily soluble in the solvents usual for these purposes and have good properties of fastness.

| | Diazo-compound from— | Coupled with— | Shade |
|---|---|---|---|
| 1 | 1-aminobenzene-3-(sulphonyl-diethylamine) | 2:3-hydroxynaphthoyl-1'-amino-Benzene-4'-(sulphonyl-n-dibutylamine) | Orange. |
| 2 | 1-amino-2-methylbenzene-5-(sulphonyl-N-(n-)butyl-[2'-methyl-] phenylamine). | ____do____ | Yellowish-red. |
| 3 | 1-amino-2-methylbenzene-5-(sulphonyl-N-benzyl-cyclohexylamine). | 2'-ethoxybenzene-5'-(sulphonyl-n-dibutylamine) | Red. |
| 4 | 1-amino-4-ethoxybenzene-5-(sulphonyl-diethylamine) | 2'-methylbenzene-5'-(sulphonyl-n-dibutylamine) | Bluish-red. |
| 5 | 1-amino-4-chlorobenzene-5-(sulphonyl-diethylamine) | 2'-methylbenzene-5'-(sulphonyl-N-(n)-butyl-phenylamine). | Red. |
| 6 | 1-amino-2-benzyloxybenzene-5-(sulphonyl-n-dibutylamine). | 2'-methylbenzene-5'-(sulphonyl-diethylamine) | Do. |
| 7 | 1-amino-4-phenoxybenzene-5-(sulphonyl-n-dibutylamine) | Benzene-4'-(sulphonyl-diethylamine) | Do. |
| 8 | 1-aminobenzene-4-(sulphonyl-n-dibutylamine) | Benzene-3'-(sulphonyl-N-methyl-phenylamine) | Orange. |
| 9 | 1-amino-2.5-dimethoxy-benzene-4-(sulphonyl-n-dibutylamine). | 2'-methoxybenzene-5'-(sulphonyl-n-dibutylamine) | Bordeaux. |
| 10 | 1-aminobenzene-4-(carbonyl-N-(n-)butyl-phenylamine) | ____do____ | Red. |
| 11 | 1-aminobenzene-3-(carbonyl-N-(n-)butyl-phenylamine) | ____do____ | Do. |
| 12 | 1-amino-2-methylbenzene-5-(carbonyl-N-(n-)butyl-phenylamine). | ____do____ | Do. |
| 13 | 1-amino-2-methoxybenzene-5-(carbonyl-N-(n-)butyl-phenylamine). | ____do____ | Bluish-red. |
| 14 | 1-amino-2:5-dimethoxybenzene-4-(carbonyl-n-dibutyl-amine). | 2'-methoxybenzene-5'-(sulphonyl-n-dibutylamine) | Red-violet. |
| 15 | 1-amino-2-methoxybenzene-5-(carbonyl-N-ethyl-cyclohexylamine). | 2'-methoxybenzene-5'-(sulphonyl-N-piperidine) | Bluish-red. |
| 16 | 1-amino-2-methoxybenzene-5-(carbonyl-N-benzyl-phenylamine). | 4'-methoxybenzene-5'-(sulphonyl-n-dibutylamine) | Do. |
| 17 | 1-aminobenzene-3-(carbonyl-dicyclohexylamine) | 4'-methylbenzene-5'-(sulphonyl-N-methyl-benzylamine). | Red. |
| 18 | 1-aminobenzene-3-(carbonyl-diphenylamine) | 2'-methylbenzene-5'-(sulphonyl-n-dibutylamine) | Do. |
| 19 | 1-amino-2-methoxybenzene-5-(carbonyl-diphenylamine) | Benzene-3'-(sulphonyl-dibutylamine) | Do. |
| 20 | 1-amino-2-methoxybenzene-5-(carbonyl-diphenylamine) | 2'-methoxybenzene-5'-(sulphonyl-n-dibutylamine) | Bluish-red. |
| 21 | 1-amino-2-methoxybenzene-5-(carbonyl-N-(n)-butyl-phenylamine). | 2'-methoxybenzene-5'-(sulphonyl-dimethylamine) | Do. |
| 22 | ____do____ | Benzene-4'-(sulphonyl-N-ethyl-cyclohexylamine) | Red. |
| 23 | 1-amino-2-methoxybenzene-5-(carbonyl-diisobutylamine) | 2'-chlorobenzene-4'-(sulphonyl-diethylamine) | Do. |
| 24 | 1-amino-2-ethoxybenzene-5-(carbonyl-n-dibutylamine) | Benzene-4'-(sulphonyl-dibenzylamine) | Do. |
| 25 | 1-amino-2-methoxybenzene-5-(carbonyl-N-ethyl-1'-naphthylamine). | 2'-methoxybenzene-5'-(carbonyl-N-piperidine) | Bluish-red. |
| 26 | 1-amino-2-methoxybenzene-5-(carbonyl-N-carbazole) | 2'-methoxybenzene-5'-(carbonyl-n-dibutylamine) | Do. |
| 27 | 1-amino-2-methylbenzene-5-(sulphonyl-n-dibutylamine) | 2'-methoxybenzene-5'-(carbonyl-N-benzyl-phenyl-amine). | Red. |
| 28 | 1-amino-2.5-dimethoxy-benzene-4-(sulphonyl-n-dibutylamine). | 2'-methoxybenzene-5'-(carbonyl-dicyclohexylamine) | Bordeaux. |
| 29 | 1-amino-4-ethoxybenzene-5-(sulphonyl-n-dibutylamine) | 2'-methylbenzene-5'-(carbonyl-diphenylamine) | Red. |
| 30 | 1-amino-2-methoxybenzene-5-(carbonyl-diphenylamine) | Benzene-2'-(carbonyl-dibenzylamine) | Yellowish red. |
| 31 | 1-amino-2-methoxybenzene-5-(sulfonyl-dimethylamine) | Benzene-2'-(sulphonyl-N-benzyl-cyclohexylamine) | Red. |
| 32 | 1-amino-2-methoxybenzene-5-(sulfonyl-N-methyl-benzylamine). | ____do____ | Do. |
| 33 | 1-amino-2.5-diethoxybenzene-4-(carbonyl-N-(n)-butyl-phenylamine). | Benzene-4'-(carbonyl-diethylamine) | Red-violet. |
| 34 | 1-amino-2-methoxybenzene-5-(sulfonyl-n-dibutylamine) | 2'-phenoxybenzene-5'-(sulphonyl-diethylamine) | Red. |
| 35 | ____do____ | 2'-benzyloxybenzene-5'-(sulfonyl-n-dibutylamine) | Do. |
| 36 | ____do____ | 2'-methoxybenzene-5'-(carbonyl-N-ethyl-1''-naphthylamine). | Do. |
| 37 | 1-amino-2-methoxy-5-methylbenzene-4-(carbonyl-N-(n)-butyl-phenylamine). | Benzene-4'-(carbonyl-N-(n)-butyl-phenylamine) | Bluish-red. |
| 38 | 1-amino-2-methoxybenzene-5-(sulfonyl-n-dibutylamine) | 2'-methoxybenzene-5'-(carbonyl-N-carbazole) | Red. |

| | Diazo-compound from— | Coupled with— | Shade |
|---|---|---|---|
| 39 | 1-amino-2.5-diethoxy-benzene-4-(carbonyl-N-(n)-butyl-phenylamine). | 4'-methyl-5'-(sulfonyl-diethylamine) | Red-violet. |
| 40 | ---do--- | 2'-methyl-5'-(sulfonyl-N-methyl-benzylamine) | Do. |
| 41 | 1-amino-2.5-dimethoxy-benzene-4-(carbonyl-N-(n)-butyl-phenylamine). | 2'-methoxybenzene-5'-(sulfonyl-diethylamine) | Do. |
| 42 | 1-aminobenzene-3-(carbonyl-dicyclohexylamine) | Benzene-4'-(sulfonyl-n-dibutylamine) | Yellowish red |
| 43 | 1-amino-2-methoxybenzene-5-(sulfonyl-n-dibutylamine) | 4'-methoxybenzene-5'-(sulfonyl-N-morpholine) | Red. |
| 44 | 1-amino-2-methoxybenzene-5-(carbonyl-N-tetrahydroquinoline). | 2'.5'-dimethoxybenzene-4'-(sulfonyl-n-dibutylamine) | Do. |
| 45 | 1-amino-4-methoxybenzene-5-(sulfonyl-N-morpholine) | 2'.4'-dimethoxybenzene-5'-(sulfonyl-n-dibutylamine) | Do. |
| 46 | 1-amino-2-methoxybenzene-5-(carbonyl-N-(n)-butyl-phenylamine). | 2'-methoxybenzene-5'-(carbonyl-diethylamine) | Do. |
| 47 | 1-amino-3-methoxybenzene-6-(carbonyl-diethylamine) | 2'.5'-dimethoxybenzene-4'-(sulfonyl-n-dibutylamine) | Do. |
| 48 | ---do--- | 2'.4'-dimethoxybenzene-5'-(sulfonyl-n-dibutylamine) | Do. |
| 49 | 1-amino-4-ethoxybenzene-6-(sulfonyl-n-dibutylamine) | ---do--- | Bluish-red. |
| 50 | 1-amino-2-methoxy-5-methyl-benzene-4-(carbonyl-N-(n)-butylphenylamine). | Benzene-4'-(carbonyl-N-(n)-butyl-phenylamine) | Red. |
| 51 | 1-amino-2-methoxybenzene-5-(sulfonyl-n-dibutylamine) | 2'.4'-dimethylbenzene-5'-(carbonyl-n-dibutylamine) | Do. |
| 52 | 1-amino-2-methoxybenzene-5-(carbonyl-N-(n)-butyl-phenylamine). | 6-methoxy-2.3-hydroxynaphthoyl-1'-amino-2'-methoxybenzene-5'-(sulfonyl-diethylamine) | Bordeaux. |
| 53 | 1-amino-2.5-dimethoxy-benzene-4-(carbony-n-dibutylamine). | ---do--- | Violet. |
| 54 | 1-amino-2.5-dimethoxy-benzene-4-(sulfonyl-n-dibutylamine). | 2'-methylbenzene-5'-(sulfonyl-diethylamine) | Red-violet. |
| 55 | ---do--- | 2'-methylbenzene-5'-(carbonyl-n-dibutylamine) | Do. |
| 56 | 1-amino-2-methoxybenzene-5-(carbonyl-diphenylamine) | 2'-methoxybenzene-5'-(sulfonyl-n-dibutylamine) | Bordeaux. |
| 57 | 1-amino-2.5-dimethoxybenzene-4-(carbonyl-N-(n)-butyl-phenylamine). | ---do--- | Violet. |
| 58 | 1-amino-2-methoxybenzene-5-(carbonyl-N-ethyl-1'-naphthylamine). | 2'-methylbenzene-5'-(sulfonyl-n-dibutylamine) | Bordeaux. |
| 59 | 1-amino-2-methoxybenzene-5-(carbonyl-diisobutylamine) | 6-bromo-2.3-hydroxynaphthoyl-1'-amino-2'-methoxybenzene-5'-(sulfonyl-diethylamine) | Bluish-red. |
| 60 | 1-amino-2-methoxybenzene-5-(carbonyl-diisobutylamine) | 2'-methylbenzene-5'-(carbonyl-n-dibutylamine) | Do. |

With other bases or naphthols of the above kind the process can be conducted in the same manner.

Since an object of the present invention is to provide dyestuffs of good fastness properties which dyestuffs are insoluble in water and alkalies, it is to be understood that the aromatic nuclei of the general formulae appearing in the appended claims, do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble monoazo dyestuffs of the following general formula:

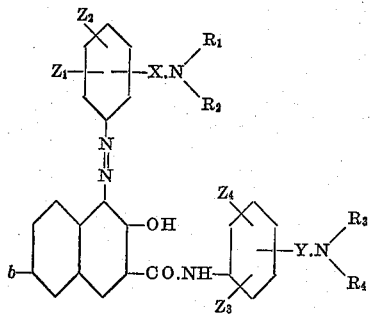

wherein X and Y stand for one of the groups —CO— and —$SO_2$—, $R_1$, $R_2$, $R_3$ and $R_4$ stand for members of the group consisting of alkyl-, benzyl-, aryl- and hydroaromatic radical which may be connected to form a heterocyclic ring system, $Z_1$ and $Z_3$ stand for members of the group consisting of hydrogen, alkyl, alkoxy, benzyloxy, phenoxy and halogen, $Z_2$ and $Z_4$ for members of the group consisting of hydrogen, alkyl and alkoxy and $b$ for a member of the group consisting of hydrogen, alkoxy and halogen, being insoluble in water, but very easily soluble in organic solvents and yielding orange to violet shades of good properties of fastness.

2. The water-insoluble monoazo dyestuffs of the following general formula:

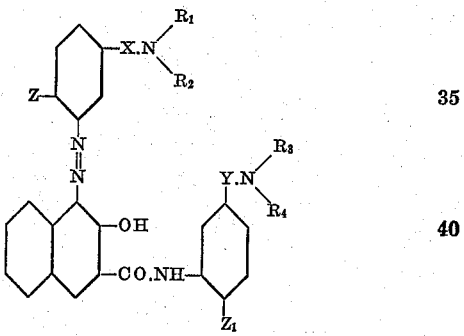

wherein X and Y stand for one of the groups —CO— and —$SO_2$—, $R_1$, $R_2$, $R_3$ and $R_4$ stand for members of the group consisting of alkyl-, benzyl-, aryl- and hydroaromatic radical which may be connected to form a heterocyclic ring system, Z and $Z_1$ stand for members of the group consisting of hydrogen, alkyl, alkoxy, benzyloxy, phenoxy and halogen, being insoluble in water, but very easily soluble in organic solvents and yielding orange to violet shades of good properties of fastness.

3. The water-insoluble monoazo dyestuff of the following formula:

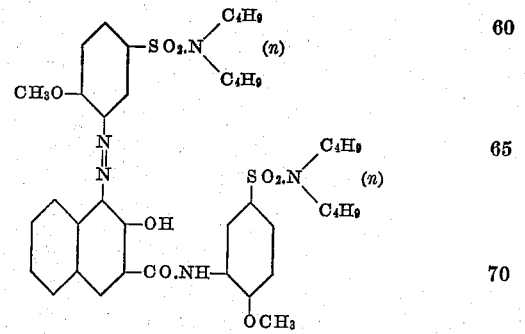

being a red powder which dissolves easily in organic solvents, such as acetone, ethyl alcohol, butyl acetate, ethyl acetate, butyl alcohol and xylene, and colors, for instance, cellulose ester lacquers vivid bluish red tints of good properties of fastness.

4. The water-insoluble monoazo dyestuff of the following formula:

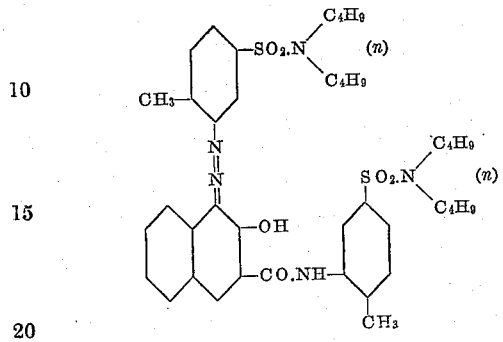

being a red powder which dissolves easily in organic solvents, such as acetone, ethyl alcohol, butyl acetate, ethyl acetate, butyl alcohol and xylene, and colors, for instance, cellulose ester lacquers vivid red tints of good properties of fastness.

5. The water-insoluble monoazo dyestuff of the following formula:

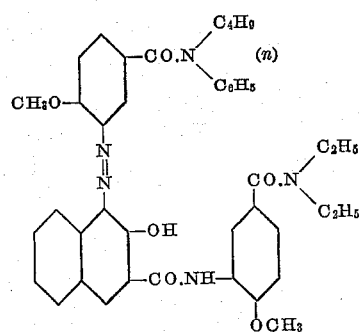

being a red powder which dissolves easily in organic solvents, such as acetone, ethyl alcohol, butyl acetate, ethyl acetate, butyl alcohol and xylene, and colors, for instance, cellulose ester lacquers vivid red tints of good properties of fastness.

ERNST FISCHER.